US007277802B1

(12) United States Patent
Dmytriw

(10) Patent No.: US 7,277,802 B1
(45) Date of Patent: *Oct. 2, 2007

(54) METHOD AND SYSTEM FOR PROVIDING A LINEAR SIGNAL FROM A MASS FLOW TRANSDUCER

(75) Inventor: Anthony M. Dmytriw, Dublin, OH (US)

(73) Assignee: Honeywell International Inc., Morristown, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/436,807

(22) Filed: May 18, 2006

(51) Int. Cl.
*G01F 1/00* (2006.01)
*G01F 17/00* (2006.01)

(52) U.S. Cl. .......................... 702/50; 73/1.34; 73/861; 702/45; 702/86

(58) Field of Classification Search ............ 702/45, 702/47, 50, 55, 127, 86; 73/202.5, 204.26, 73/1.34, 861; 62/129, 225
See application file for complete search history.

(56) References Cited

U.S. PATENT DOCUMENTS

| | | | | |
|---|---|---|---|---|
| 4,341,107 A | * | 7/1982 | Blair et al. ................... | 73/1.34 |
| 5,892,145 A | | 4/1999 | Moon et al. ................ | 73/118.2 |
| 6,684,695 B1 | | 2/2004 | Fralick et al. ............ | 73/204.26 |
| 6,805,003 B2 | | 10/2004 | Ueki et al. ............... | 73/204.26 |
| 6,820,481 B1 | | 11/2004 | Weber et al. ............ | 73/204.26 |
| 6,912,918 B1 | | 7/2005 | Lynnworth et al. ...... | 73/861.26 |
| 7,073,392 B2 | * | 7/2006 | Lull et al. ..................... | 73/861 |
| 2004/0026365 A1 | | 2/2004 | Fuertsch et al. .............. | 216/39 |
| 2005/0189343 A1 | | 9/2005 | Griffin et al. ............... | 219/494 |
| 2006/0048568 A1 | | 3/2006 | Korniyenko et al. ..... | 73/204.22 |
| 2006/0059986 A1 | | 3/2006 | Wildgen ................... | 73/202.5 |

FOREIGN PATENT DOCUMENTS

EP          574288 A   * 12/1993

OTHER PUBLICATIONS

Error handling process for digital audio signal transmission system—using Fourier transform to enable prediction of data, and concealment of signal errors, Abstarct, Mahieux, EP 574288 A, Dec. 15, 1993.*
U.S. Appl. No. 11/545,828.*

* cited by examiner

*Primary Examiner*—Bryan Bui
*Assistant Examiner*—John Le
(74) *Attorney, Agent, or Firm*—Kermit D. Lopez; Luis M. Ortiz

(57) ABSTRACT

A method and system for providing a linear signal from mass flow transducer approximates the error from the original raw signal using discrete sine functions and subtracts the approximated error from the original raw signal. The method and system can be implemented using an ASIC (Application Specific Integrated Circuit) mated with a raw mass flow transducer. The method and system for linearizing the signal can be contained in the ASIC, and allows for improved accuracy in the linear signal with few coefficients and mathematical steps.

10 Claims, 6 Drawing Sheets

METHOD AND SYSTEM FOR PROVIDING A LINEAR SIGNAL FROM A MASS FLOW TRANSDUCER

TECHNICAL FIELD

Embodiments are generally related to flow sensors. Embodiments are also related to mass flow transducers. Embodiments are additionally related to techniques and devices for providing a linear signal from a mass flow transducer.

BACKGROUND OF THE INVENTION

Mass Flow transducers are used in a variety of industries to quantify the flow rate of a substance. For example, the medical industry uses mass flow transducers to monitor and control a person's breathing. One common technique for sensing mass flow is to utilize multiple resistive temperature detectors on each side of a heating element parallel to the direction of flow. As a mass such as a fluid or gas flows across the resistors, the resistors that are located upstream from the heating element are cooled, and the resistors located downstream from the heating element are heated. When a voltage is applied across these resistors, an electrical signal is generated. The signal generated using multiple resistive temperature detectors are highly non-linear and not ideal for use in most "high accuracy" control systems.

Two types of methods are currently utilized to approximate a non-linear mass flow signal into a linear output: piece-wise linear functions or polynomial approximation. In piece-wise linear functions, the linear signal is approximated by many linear equations distributed throughout the range of the signal. In polynomial approximation, a polynomial expression is used to describe the signal.

A need exists for improved accuracy in the generation of linear signal with less coefficients and mathematical steps as a part of mass flow transducer. It is believed that a solution to this problem involves the implementation of an improved method and system for linearizing the raw output of a mass flow transducer as described in greater detail herein.

BRIEF SUMMARY

The following summary is provided to facilitate an understanding of some of the innovative features unique to the embodiments disclosed and is not intended to be a full description. A full appreciation of the various aspects of the embodiments can be gained by taking the entire specification, claims, drawings, and abstract as a whole.

It is, therefore, one aspect of the present invention to provide for an improved flow sensor method and system.

It is another aspect of the present invention to provide for a method and system for generating a linear signal from a mass flow transducer.

It is another aspect of the present invention to provide a method and system for linearizing a raw output signal from a mass flow transducer.

It is a further aspect of the present invention to provide for a method and system for providing a linear signal from a mass air flow and liquid flow transducer.

The aforementioned aspects and other objectives and advantages can now be achieved as described herein. The method for providing a linear signal from mass flow transducers approximates the error from the original raw signal using discrete sine functions and subtracts the approximated error from the original raw signal. This invention can be implemented using an ASIC (Application Specific Integrated Circuit) mated with a raw mass flow transducer. The method for linearizing the signal will be contained in the ASIC. This method allows for improved accuracy in the linear signal with less coefficients and mathematical steps.

BRIEF DESCRIPTION OF THE DRAWINGS

The accompanying figures, in which like reference numerals refer to identical or functionally-similar elements throughout the separate views and which are incorporated in and form a part of the specification, further illustrate the embodiments and, together with the detailed description, serve to explain the embodiments disclosed herein.

DETAILED DESCRIPTION

The particular values and configurations discussed in these non-limiting examples can be varied and are cited merely to illustrate at least one embodiment and are not intended to limit the scope thereof.

Figure 1:
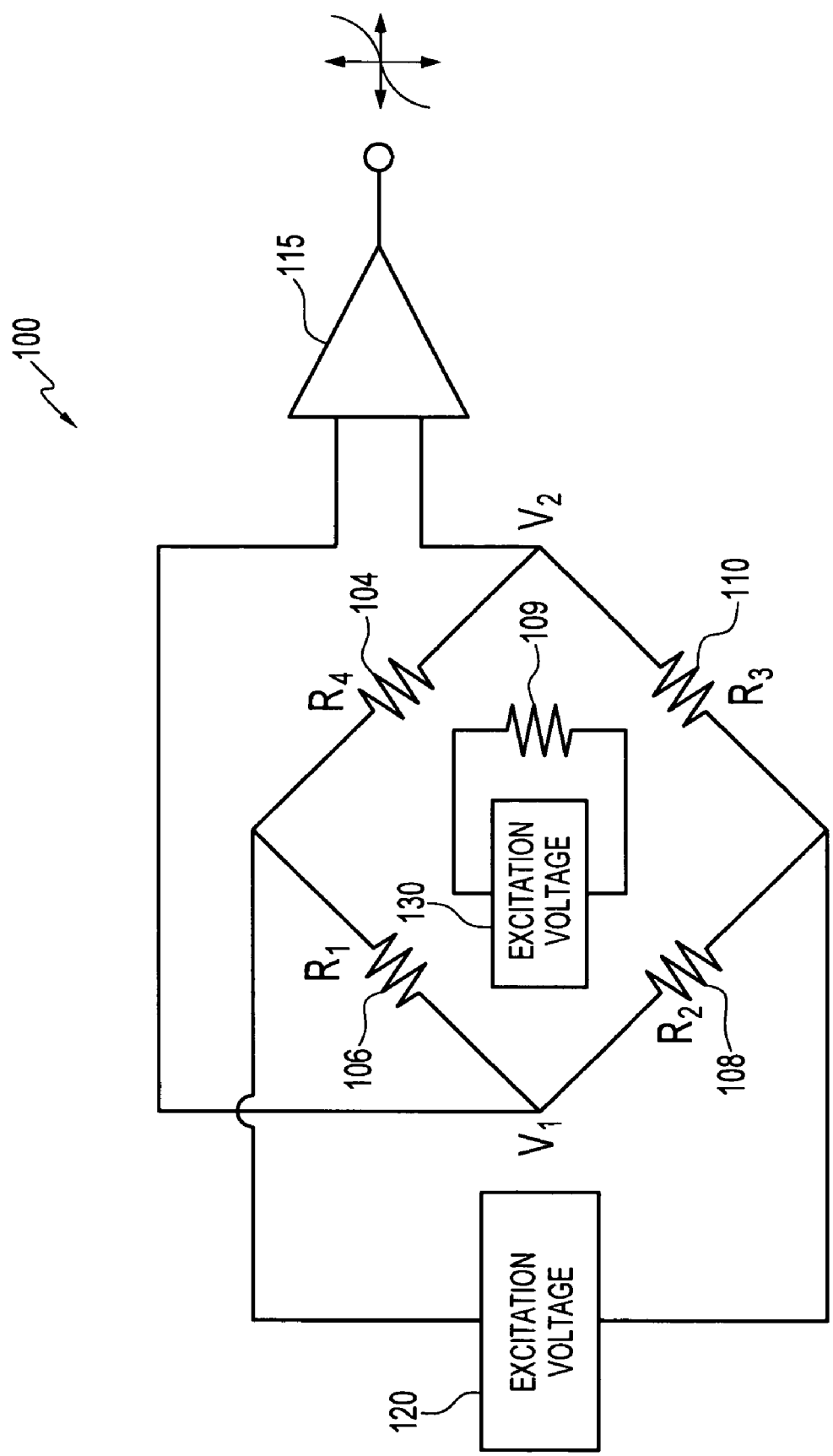
FIG. 1 illustrates a schematic diagram of a bridge circuit that can be adapted for use with a mass flow transducers, in accordance with a preferred embodiment.

FIG. 1 illustrates a schematic diagram of bridge circuit 100 that can be adapted for use with a mass flow transducer, and implemented in accordance with a preferred embodiment. Circuit 100 generally includes a group of resistors 104, 106, 108, 110, which are connected to an excitation voltage 120 and an amplifier 115. The resistors 104, 106, 108, 110 are arranged as a Wheatstone bridge circuit and are connected to the amplifier 115 at nodes $V_1$ and $V_2$. The circuit 100 can be implemented in the context of an ASIC (Application Specific Integrated Circuit).

As mass flows across the group of resistors 104, 106, 108, 110, the resistors 106 and 110 upstream from a resistor 109 (i.e., a heater) are cooled and the resistors 104 and 108 downstream from the heater or resistor 109 are heated. Note that the resistor 109 is connected to an excitation voltage 130. An electrical signal can be generated when the excitation voltage 120 is applied across the group of resistors 104, 106, 108, 110. A temperature difference is produced by the fluid stream passing over the heater 109 and then over the resistors 104 and 108. This temperature difference, unbalances the bridge causing a voltage difference that is amplified using the amplifier 115 and then calibrated to the mass flow rate. The signal obtained from the amplifier 115 generally constitutes a non-linear raw signal with respect to fluid flow.

Figure 2:
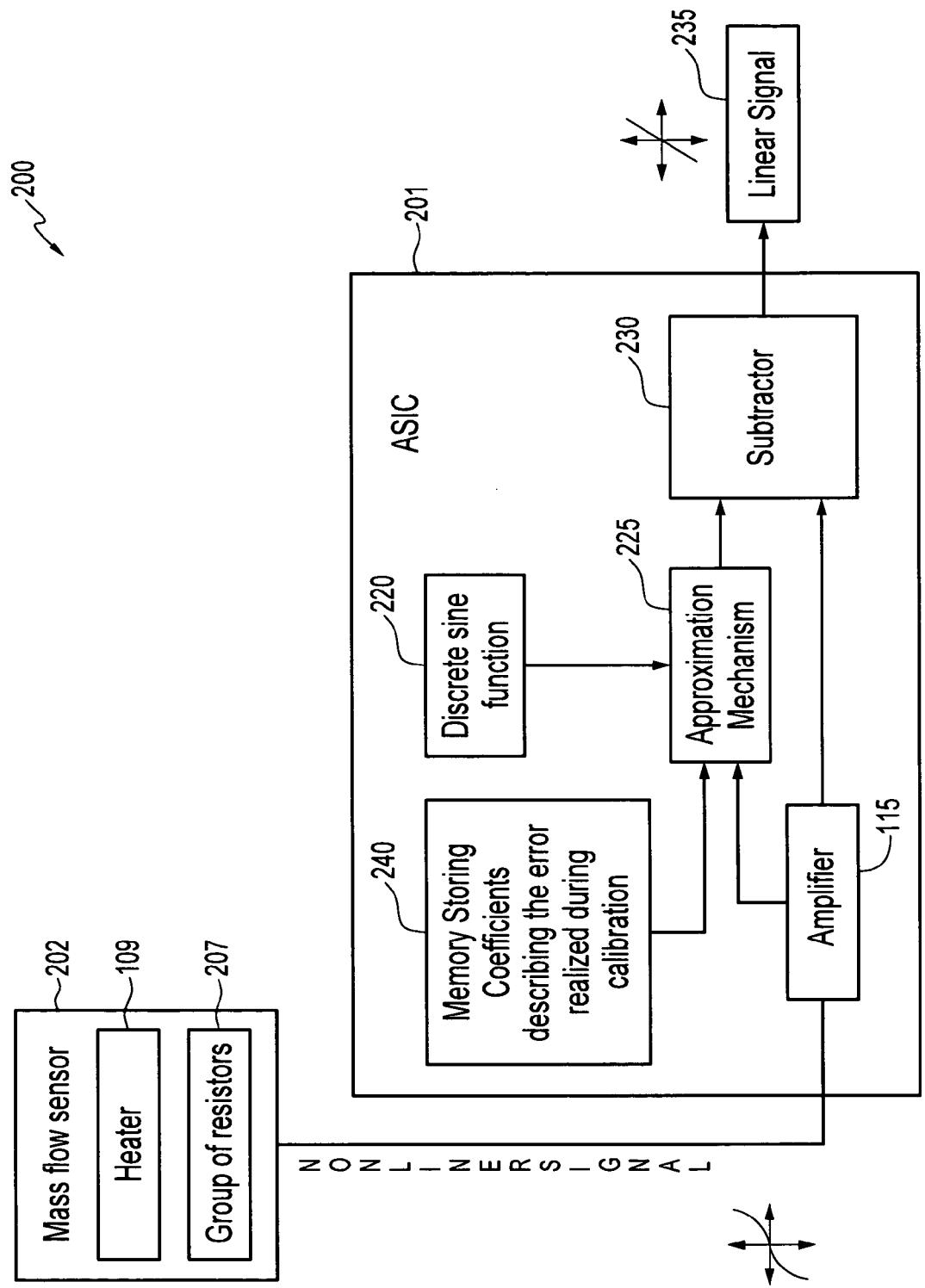
FIG. 2 illustrates a schematic diagram of a process for linearizing a non-linear raw signal, in accordance with a preferred embodiment.

FIG. 2 illustrates a schematic diagram of a system 200 of linearizing the non-linear raw signal obtained from the amplifier 115, in accordance with a preferred embodiment. Note that in FIGS. 1-2, identical or similar parts or elements are generally indicated by identical reference numerals. For example, resistors 104, 106, 108, 110 depicted in FIG. 1, generally represent the group of resistors 207 depicted in FIG. 2. The amplifier 115 and heater 109 of the bridge circuit 100 are also depicted in FIG. 2 and can be adapted for use with a mass flow transducer 202, which is electrically connected to an ASIC 201. The ASIC 201 generally includes an amplifier 115, which provides an electrical signal to an approximation mechanism 225. ASIC 201 also includes a memory 240, which can store coefficients describing an error realized during calibration. Memory 240 and amplifier 115 are electrically connected to an approximation mechanism 225.

The output signal from the circuit 100 can be provided to the amplifier 115 and is subject to amplification by amplifier 115. The output signals from a memory storing coefficients describing an error realized during calibration are stored in memory 240. The data stored in memory 240 and an amplified non-linear signal from amplifier 115 can be provided as input signals to approximation mechanism 225. Such an approximation method approximates an error from the original non-linear raw signal utilizing a circuit 220 for generating a discrete sine function. A subtractor 230 can then be utilized to subtract the approximated error from the original non-linear raw signal, in order to obtain a linear signal 235. Thus, the embodiments described herein can be implemented using ASIC 201 (Application Specific Integrated Circuit) mated with a raw mass flow transducer 202.

Figure 3:
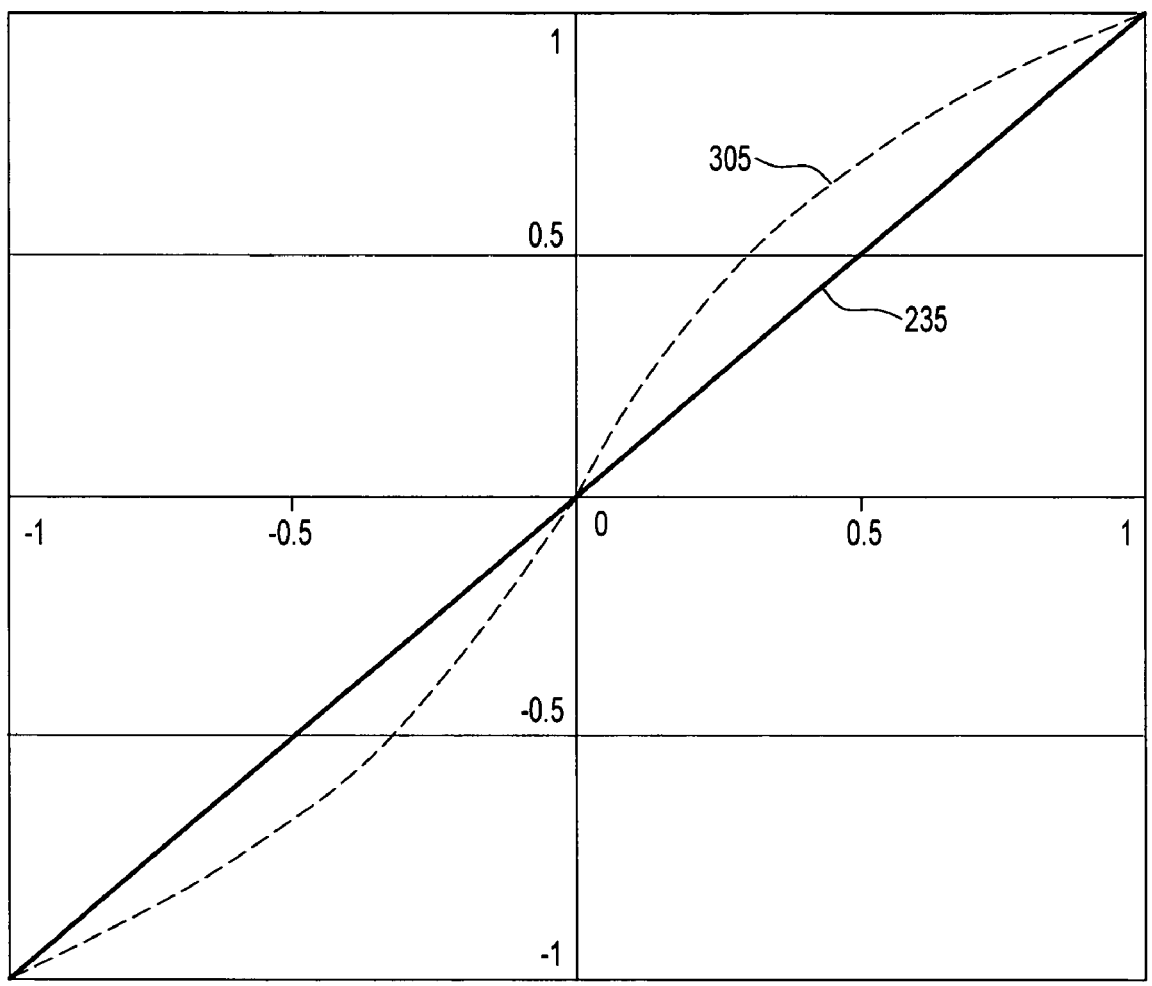
FIG. 3 illustrates a graph depicting the voltage signal verses airflow of the non-compensated and compensated (desired) signals, in accordance with a preferred embodiment.

FIG. 3 illustrates a graph 300 depicting the variation of voltage verses fluid flow for a non-linear, non-compensated, signal 305 and a linear desired signal 235 in accordance with a preferred embodiment. As indicated in graph 300, a non-linear raw signal 305 obtained from a mass flow transducer 202 is converted into a linear signal 235 as a result of the operations depicted in FIG. 2 and in association with the circuit 100 depicted in FIG. 1. The method for linearizing the signal will be contained in the ASIC 201.

Figure 4:
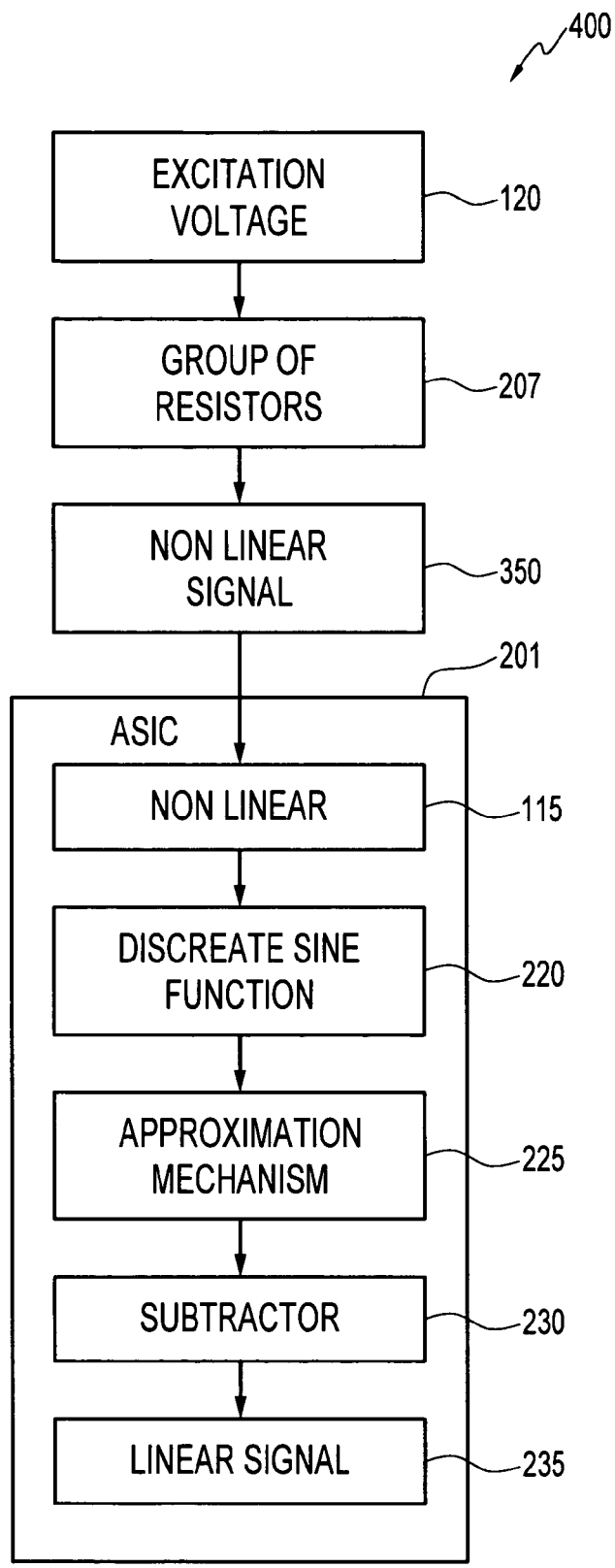
FIG. 4 illustrates a block diagram showing a process of linearizing a non-linear signal using an ASIC, in accordance with a preferred embodiment.

FIG. 4 illustrates a block diagram 400 showing a process of linearizing a non-linear signal using an ASIC 201, in accordance with a preferred embodiment. Note that in FIGS. 1-3, identical or similar parts or elements are generally indicated by identical reference numerals. The FIG. 4 illustrates a group of resistors 207, an excitation voltage 120, an amplifier 115, a non linear signal 350, an ASIC 201, a circuit 220 for generating discrete sine functions, a subtractor 230, an approximation mechanism 225 and a linear signal 235 as depicted previously with respect to in FIG. 2 and FIG. 3.

Figure 5:
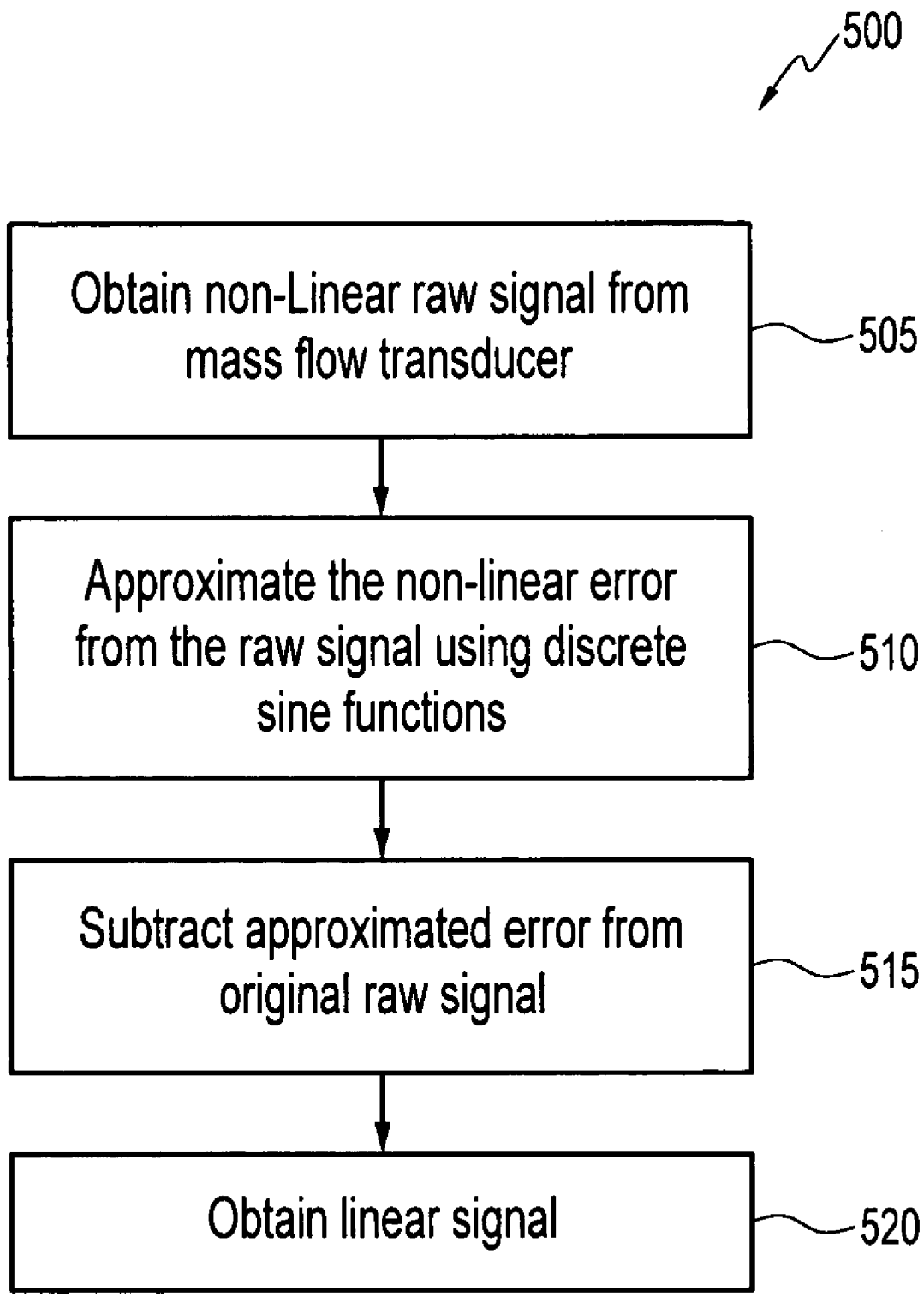
FIG. 5 illustrates a high level flow chart of operations depicting a linearization method for a mass flow transducers, in accordance with a preferred embodiment.

FIG. 5 illustrates a high level flow chart of operations depicting a linearization method 500 for a mass flow transducer 202, in accordance with a preferred embodiment. As indicated at block 505, a linear signal can be obtained from the mass flow transducer 202 depicted in FIG. 2. Thereafter, as described at block 510, a non-linear error obtained from the raw output signal generated by circuit 100 depicted in FIG. 1 can be approximated using a discrete sine function generated by the circuit 220 depicted in FIG. 2. Thereafter, as depicted at block 520, a linear signal can be obtained by subtracting (e.g., using the subtractor 230 depicted in FIG. 2) the approximated error from the original raw signal as depicted previously at block 515.

Figure 6:
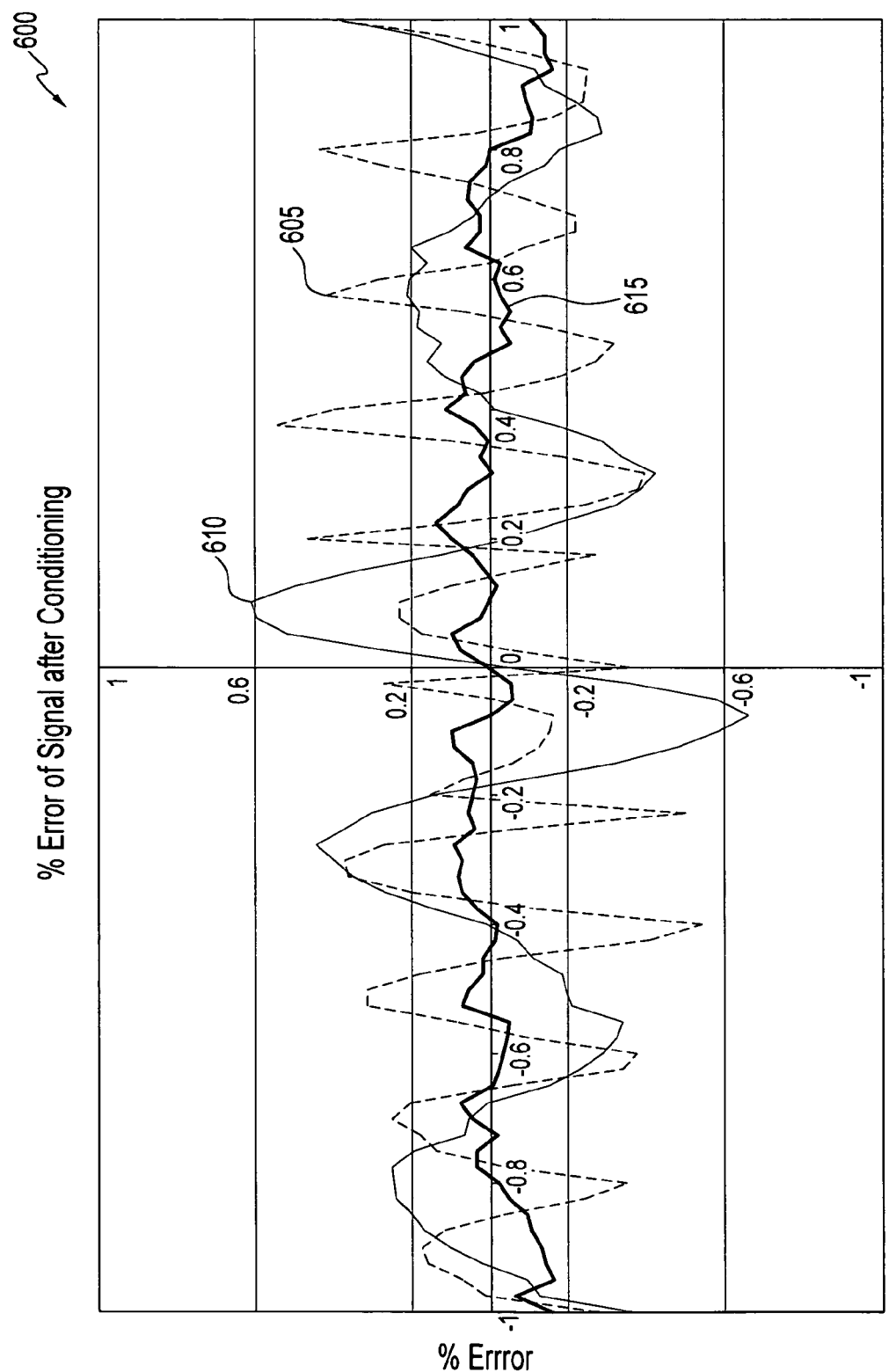
FIG. 6 illustrates a graph depicting a percentage error verses normalized flow for the linearized output of a mass flow transducer, in accordance with a preferred embodiment.

FIG. 6 illustrates a graph 600 depicting a percentage error verses normalized flow for the linearized output of mass flow sensor, in accordance with a preferred embodiment. As indicated in graph 600, an optimized $7^{th}$ order polynomial approximation 610 and a 10 segment piece-wise linear approximation 605 can be compared with the Error Plot of subtracting 7 optimized sinusoidal curves 615 used to approximate the original error from the raw signal.

It will be appreciated that variations of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A method for providing a linear signal from mass flow transducers, comprising:

obtaining a non-linear raw signal from a mass flow transducer;

approximating a non-linear error from said non-linear raw signal;

subtracting from said non-linear raw signal, an approximated error; and obtaining a linear signal from said subtracted result in order to linearize a raw output from said mass flow transducer; and associating said mass flow transducer with an Application Specific Integrated Circuit (ASIC), said ASIC comprising a memory for storing a plurality of memory storing coefficients, wherein said plurality of memory storing coefficients describes an error realized during a calibration of mass flow;

an amplifier;

an approximation mechanism for performing an approximation calculation, wherein said approximation receives said plurality of memory storing coefficients from said memory and an output signal from said amplifier and wherein said approximation mechanism approximates said non-linear error from said non-linear raw signal;

a circuit for generating said discrete sine functions, wherein said circuit provides said discrete sine function to said approximation mechanism; and a subtractor that receives an output signal from said amplifier and an output signal from said approximation mechanism, wherein said subtractor subtracts said approximated error from said non-linear signal to produce said subtracted result.

2. The method of claim 1 wherein said approximation mechanism approximates an error from said non-linear raw signal utilizing said discrete sine functions.

3. A system for providing a linear signal from a mass flow transducer, comprising:

a mass flow transducer that generates a non-linear raw signal, wherein said mass flow transducer is associated with an ASIC (Application Specific Integrated Circuit);

an approximation mechanism for approximating a non-linear error from said non-linear raw signal;

a subtractor for subtracting an approximated error from said non-linear raw signal a linear signal obtained from said subtracted result in order to linearize a raw output from said mass flow transducer; and wherein said ASIC associated with said mass flow transducer comprises:
   a memory for storing a plurality of memory storing coefficients;
   an amplifier;
   an approximation mechanism for performing an approximation calculation, wherein said approximation receives said plurality of memory storing coefficients from said memory and an output signal from said amplifier, wherein said approximation mechanism approximates an error from said non-linear raw signal utilizing discrete sine functions;
   a circuit for generating said discrete sine function, wherein said circuit provides said discrete sine function to said approximation mechanism; and
   a subtractor that receives an output signal from said amplifier and an output signal from said approximation mechanism.

4. The system of claim 3 wherein said plurality of memory storing coefficients describes an error realized during a calibration of mass flow.

5. The system of claim 3 wherein said mass flow transducer comprises a heater mechanism in association with a plurality of resistors arranged in a bridge configuration.

6. The system of claim 3 wherein said mass flow transducer comprises a plurality of resistors connected to an excitation voltage and an amplifier.

7. A system for providing a linear signal from a mass flow transducer, comprising:
   a mass flow transducer that generates a non-linear raw signal;
   an approximation mechanism for approximating a non-linear error from said non-linear raw signal;
   a subtractor for subtracting an approximated error from said non-linear raw signal;
   a linear signal obtained from said subtracted result in order to linearize a raw output from said mass flow transducer; and
   an Application Specific Integrated Circuit (ASIC) associated with said mass flow transducer, wherein said ASIC comprises said approximation mechanism and said subtractor, and further comprises:
     a memory for storing a plurality of memory storing coefficients;
     an amplifier;
     a approximation mechanism for performing an approximation calculation, wherein said approximation receives said plurality of memory storing coefficients from said memory and an output signal from said amplifier;
     a circuit for generating discrete sine functions, wherein said circuit provides said discrete sine functions to said approximation mechanism; and
     a subtractor that receives an output signal from said amplifier and an output signal from said approximation mechanism.

8. The system of claim 7 wherein said plurality of memory storing coefficients describes an error realized during a calibration of mass flow.

9. The system of claim 7 wherein said approximation mechanism approximates an error from said non-linear raw signal utilizing said discrete function sine functions.

10. The system of claim 7 wherein said mass flow transducer comprises a heater mechanism in association with a plurality of resistors arranged in a bridge configuration.

\* \* \* \* \*